(12) United States Patent
Tonetti et al.

(10) Patent No.: US 7,267,117 B2
(45) Date of Patent: Sep. 11, 2007

(54) METHOD AND DEVICE FOR CONTROLLING THE EXHAUST GAS RECIRCULATION IN AN INTERNAL-COMBUSTION ENGINE BASED ON THE MEASUREMENT OF THE OXYGEN CONCENTRATION IN THE GASEOUS MIXTURE TAKEN IN BY THE ENGINE

(75) Inventors: Marco Tonetti, Orbassano (IT); Enrico Lanfranco, Orbassano (IT); Andrea Ruggiero, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 37 days.

(21) Appl. No.: 11/116,364

(22) Filed: Apr. 28, 2005

(65) Prior Publication Data

US 2005/0274369 A1    Dec. 15, 2005

(30) Foreign Application Priority Data

Jun. 15, 2004    (EP)    .................................. 04425445

(51) Int. Cl.
*F02B 47/08* (2006.01)
*F02D 41/00* (2006.01)
*F02M 25/00* (2006.01)

(52) U.S. Cl. ............ 123/704; 123/568.11; 123/568.21; 701/108; 701/109; 73/118.2

(58) Field of Classification Search ........... 123/568.11, 123/568.21, 90.11, 90.15, 435, 559.1, 704; 60/276, 285; 701/108–109; 73/118.1, 118.2
See application file for complete search history.

(56) References Cited

U.S. PATENT DOCUMENTS

| 4,614,175 A | | 9/1986 | Asayama |
| 4,823,760 A | | 4/1989 | Nishida |
| 5,205,260 A | * | 4/1993 | Takahashi et al. .......... 123/494 |
| 6,000,385 A | * | 12/1999 | Fukuma ...................... 123/704 |

(Continued)

FOREIGN PATENT DOCUMENTS

EP    0 843 084 A2    5/1998

(Continued)

OTHER PUBLICATIONS

Nishida Minoru et al., Journal of Engines, vol. 97, 1988, pp. 6168-6180.

*Primary Examiner*—Hai Huynh
(74) *Attorney, Agent, or Firm*—Birch, Stewart, Kolasch & Birch, LLP

(57) ABSTRACT

A method and a device for controlling the exhaust gas recirculation in an internal-combustion engine are described herein. The engine is provided with an air-intake system, a gas-exhaust system, and an exhaust-gas-recirculation system. A linear oxygen sensor is arranged along the air-intake system in a section traversed, in use, by the air/recirculated-exhaust-gas mixture, for measuring the oxygen concentration in the mixture itself An electronic control unit is connected to the oxygen sensor and to the exhaust-gas-recirculation system for controlling the flow rate of recirculated exhaust gases on the basis of the oxygen concentration in the mixture taken in by the engine. In particular, the oxygen sensor is a UHEGO probe.

38 Claims, 3 Drawing Sheets

U.S. PATENT DOCUMENTS

| | | | |
|---|---|---|---|
| 6,029,451 A * | 2/2000 | Gartner | 60/605.2 |
| 6,035,639 A | 3/2000 | Kolmanovsky et al. | |
| 6,321,732 B1 * | 11/2001 | Kotwicki et al. | 123/568.16 |
| 6,378,508 B1 * | 4/2002 | Braun et al. | 123/568.12 |
| 6,595,191 B2 * | 7/2003 | Braun et al. | 123/568.21 |
| 6,609,058 B1 * | 8/2003 | Russell et al. | 701/104 |
| 6,718,942 B2 * | 4/2004 | Burgio et al. | 123/350 |
| 6,739,177 B2 * | 5/2004 | Sato et al. | 73/23.31 |
| 6,857,263 B2 * | 2/2005 | Gray et al. | 60/278 |
| 7,047,933 B2 * | 5/2006 | Gray, Jr. | 123/305 |
| 7,055,508 B2 * | 6/2006 | Matsunaga et al. | 123/568.21 |
| 7,151,994 B2 * | 12/2006 | Fuwa | 701/114 |
| 2004/0084015 A1 | 5/2004 | Sun et al. | |
| 2005/0139193 A1 * | 6/2005 | Kobayashi et al. | 123/350 |
| 2007/0074707 A1 * | 4/2007 | Ogawa et al. | 123/568.14 |

FOREIGN PATENT DOCUMENTS

| | | |
|---|---|---|
| FR | 2 805 568 A | 8/2001 |
| WO | WO-2004/044406 A1 | 5/2004 |

* cited by examiner

METHOD AND DEVICE FOR CONTROLLING THE EXHAUST GAS RECIRCULATION IN AN INTERNAL-COMBUSTION ENGINE BASED ON THE MEASUREMENT OF THE OXYGEN CONCENTRATION IN THE GASEOUS MIXTURE TAKEN IN BY THE ENGINE

The present invention relates to a method and a device for controlling the exhaust gas recirculation in an internal-combustion engine based on the measurement of the oxygen concentration in the gaseous mixture taken in by the engine. In particular, the present invention finds advantageous, but non-exclusive, application in a supercharged diesel engine, to which the following description will make reference, without this implying any loss in generality.

In internal-combustion engines, it is known practice to recirculate exhaust gases (hereinafter, reference will be made to exhaust-gas recirculation or EGR) for the abatement of pollutant emissions, in particular to reduce the nitrogen oxides ($NO_x$) emitted by the engine.

In particular, according to this technique, a fraction of the exhaust gases is re-introduced into the air-intake system so as to dilute the air taken in by the engine and hence reduce the temperature in the combustion chamber and consequently the formation of nitrogen oxides. The flow rate of the recirculated gases is controlled via a regulation valve set along a conduit connecting the exhaust system with the intake system.

The quantities most directly correlated to the level of pollutant emissions, and hence most important for a correct management of the EGR system, are the concentration of recirculated exhaust gases (% EGR) in the gaseous mixture taken in by the engine, and the air/fuel ratio (A/F), which provides an indication of the amount of fresh air available for the process of combustion.

Said quantities are defined respectively as:

$$\% \, EGR = \frac{\text{Mass flow of recirculated exhaust gases}}{\text{Mass flow of mixture taken in}}; \text{ and}$$

$$\frac{A}{F} = \frac{\text{Mass flow of fresh air taken in}}{\text{Mass flow of fuel}}$$

The EGR system is currently subject to a closed-loop control in order to bring the flow rate of fresh air taken in by the engine, and hence the air/fuel ratio in the combustion chamber, to a target value.

To obtain the information regarding the air/fuel ratio, it is known practice to install within the exhaust system an oxygen-concentration linear sensor, known as UHEGO (Universal Heated Exhaust Gas Oxygen Sensor) probe, which supplies an electrical signal indicating the oxygen concentration in the exhaust gases, a quantity which can be directly correlated to the air/fuel ratio (A/F) in the combustion chamber. A device for measuring the air flow rate (debimeter) is instead usually installed in the intake system; this device outputs an electrical signal indicating the flow rate of fresh air taken in by the engine. In detail, the air/fuel ratio is obtained either through the measurement supplied by the UHEGO probe arranged in the exhaust system, or as a ratio between the flow rate of air taken in measured by the debimeter and an amount of fuel estimated by the engine-control unit on the basis of the operating conditions of the engine.

Although widely used, a control of the EGR system based on the air/fuel ratio has some drawbacks that do not enable an adequate exploitation of all its qualities. In particular, given that the air/fuel ratio is a quantity obtained indirectly and that the debimeter is always subject to dirtying effects and to drifts over time, a control of the EGR system based upon the air/fuel ratio does not prove adequately efficient to meet future standards on pollutant emissions of motor vehicles.

The purpose of the present invention is consequently to provide a more accurate control of engine operation and, in particular, of the exhaust-gas recirculation.

According to the present invention, there are consequently provided a method and a device for controlling exhaust-gas recirculation in an internal-combustion engine, as defined in Claim 1 and Claim 13, respectively.

For a better understanding of the present invention, there is now described a preferred embodiment, purely by way of non-limiting example and with reference to the attached drawings, in which.

The idea underlying the present invention envisages arranging an oxygen-concentration sensor, in particular a UHEGO probe, in the air-intake system for determining the oxygen concentration in the gaseous mixture taken in by the engine. As will be described in detail, a wide range of opportunities derives from this basic idea, which allows to obtain a more accurate control of the engine operation, in particular of the recirculation of the exhaust gases.

Figure 1:
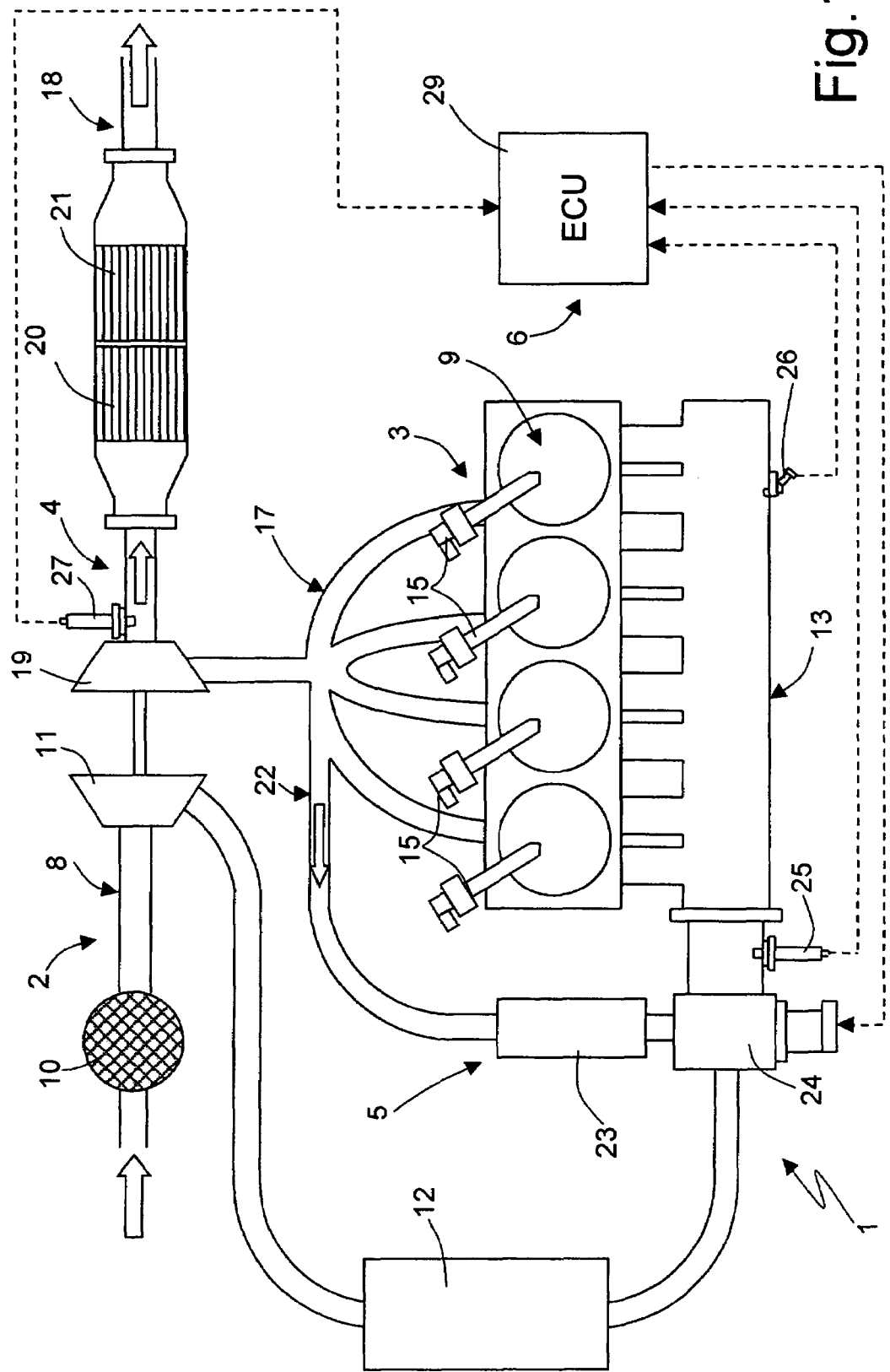
FIG. 1 is a schematic illustration of a portion of an internal-combustion engine according to a first embodiment of the present invention.

With reference now to FIG. 1, number 1 designates, as a whole, a supercharged diesel engine.

The engine 1 is provided with: an air-intake system 2; a fuel-injection system 3; a gas-exhaust system 4; an exhaust-gas-recirculation system 5; and an electronic control system 6 for controlling the aforesaid systems.

In detail, the air-intake system 2 comprises: an air-intake conduit 8, which receives at input the air through an air filter 10; an air-intake manifold 13, which receives the air from the air-intake conduit 8 and supplies it to the engine cylinders 9; and a compressor 11 and an intercooler 12 arranged in a known way along the air-intake conduit 8 itself.

The injection system 3, of a known type, comprises, among other things, a plurality of electro-injectors 15, one for each cylinder 9 of the engine 1, which inject fuel at high pressure into the cylinders 9.

The gas-exhaust system 4 comprises: an exhaust-gas manifold 17, which is connected to the cylinders 9 and receives exhaust gases produced by combustion; an exhaust-gas conduit 18, which is connected to the exhaust-gas manifold 17 and along which there are arranged in cascaded fashion a turbine 19, connected in a known way to the compressor 11 to provide a turbocharger, an oxidizing catalytic converter 20, and a diesel-particulate filter (DPF) 21.

The exhaust-gas-recirculation system 5 comprises: an exhaust-gas-recirculation conduit 22 connecting the gas-exhaust system in a point upstream of the turbine 19, to the air-intake system 2, in a point downstream of the intercooler 12; and a control solenoid valve 24, known as EGR valve, arranged along the exhaust-gas-recirculation conduit 22, for example in the point in which this is connected to the air-intake system 2.

The exhaust-gas-recirculation system 5 can additionally comprise an additional intercooler 23 (EGR cooler) arranged along the exhaust-gas-recirculation conduit 22.

The electronic control system 6 comprises: a first linear oxygen sensor 25 (which will be referred to, in what follows, as first UHEGO probe 25) arranged in the air-intake system 2 in a point downstream of the EGR valve 24 and close to the cylinders 9, for determining the oxygen concentration in the gaseous mixture taken in, which is constituted by air and recirculated exhaust gases; a temperature/pressure sensor 26 set in the air-intake manifold 13, downstream of the EGR valve 24, for measuring the temperature and pressure of the gaseous mixture taken in; a second linear oxygen sensor 27 (which will be referred to, in what follows, as second UHEGO probe 27) arranged in the gas-exhaust system 4, for determining the oxygen concentration in the exhaust gases; and an electronic control unit 29 connected to the aforesaid sensors to supply, among other things, a driving signal for the EGR valve 24. The electronic control unit 29, as will be described in detail, performs a closed-loop control of the exhaust gas recirculation, based on a concentration of recirculated exhaust gases in the mixture taken in.

In particular, it should be noted how the electronic control system 6, unlike known control systems, is not provided with a device for measuring the air flow rate (debimeter) arranged in the air-intake system 2, typically upstream of the compressor 11.

Figure 2:
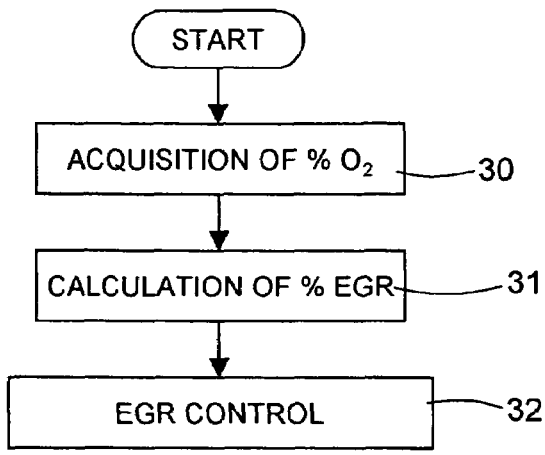
FIGS. 2-4 illustrate flowcharts corresponding to operations for controlling exhaust-gas recirculation in the engine of FIG. 1.

The operations carried out by the electronic control unit 29 for closed-loop control of the exhaust-gas recirculation will now be described, with reference initially to the flow-chart of FIG. 2.

In detail, in an initial block 30 the electronic control unit 29 acquires from the first UHEGO probe 25 the measurement of the oxygen concentration in the gaseous mixture taken in.

Since the mixture taken in is made up of fresh air and recirculated exhaust gases, i.e., two gaseous species having different oxygen concentrations, the measurement made by the first UHEGO probe 25 can be correlated to the composition of the mixture, and in particular to the exhaust gases concentration in the mixture.

In detail, in a block 31 subsequent to block 30, the concentration of recirculated exhaust gases (% EGR) is calculated according to the measured oxygen concentration, with the following formula:

$$\% \, EGR = 1 - \frac{\% \, O_{2,air+EGR}}{\% \, O_{2,air}} \quad (1)$$

in which % $O_{2,air}$ is the oxygen concentration in the air, equal to approximately 21%, and % $O_{2,air+EGR}$ is the oxygen concentration in the gaseous mixture taken in, measured by the first UHEGO probe 25.

The electronic control unit 29 thus implements (block 32) a closed-loop control of the exhaust gas recirculation, directly on the basis of the concentration of recirculated exhaust gases in the gaseous mixture taken in. In particular, the electronic control unit 29 compares the measured value of the exhaust gas concentration with a reference value of exhaust-gas concentration, representing an optimized value for the containment of the pollutant emissions, and generates an appropriate driving signal for the EGR valve 24 to cause the two values to equal one another. The reference concentration of exhaust gases can for example be mapped in the memory as a function of given quantities of the engine, representing the operating condition of the engine, for example, engine r.p.m., amount of fuel injected, flow rate of fresh air, etc.

Figure 3:
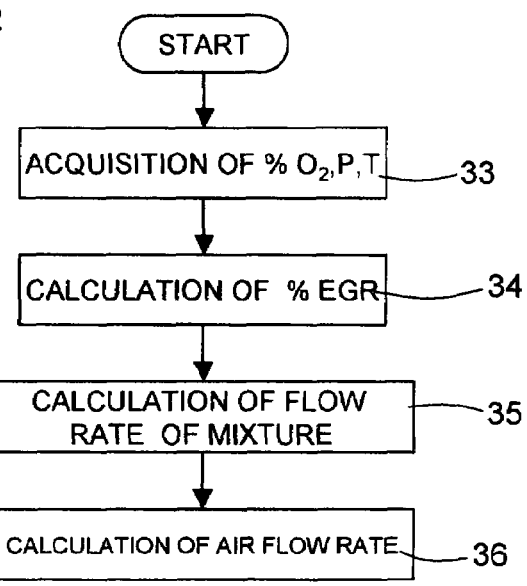

In particular, the flow rate of fresh air taken in by the engine, which is essential for determining the air/fuel ratio, is calculated by the electronic control unit 29 in the way described in what follows (FIG. 3).

In detail, in an initial block 33 the electronic control unit 29 acquires from the first UHEGO probe 25 the measurement of the oxygen concentration in the gaseous mixture taken in, and from the temperature/pressure sensor 26 the pressure and temperature values of the gaseous mixture.

In a block 34 subsequent to block 33 the concentration of recirculated exhaust gases (% EGR) is calculated in a way equivalent to what has been described with reference to block 31 of FIG. 2.

Next, in a block 35 subsequent to block 34 the flow rate of the gaseous mixture taken in by the engine is calculated using the "speed-density" method as a function of the measured values of pressure and temperature in the air-intake manifold 13 and according to the engine r.p.m.

In detail, the speed-density method is based upon the perfect gas equation of state, expressed in the form:

$$\frac{P_{manifold}}{\rho} = R \cdot T_{manifold} \quad \Rightarrow \quad \rho = \frac{P_{manifold}}{R \cdot T_{manifold}}$$

in which $P_{manifold}$, $\rho$ and $T_{manifold}$ are respectively the pressure, density and temperature of the gaseous mixture in the air-intake manifold 13, whilst R is a constant characteristic of the gaseous mixture.

The density $\rho$ can moreover be expressed as the ratio between the mass flow ($\dot{M}_{intake}$) and the volume flow rate ($\dot{V}_{intake}$) of the gaseous mixture taken in, so that:

$$\rho = \frac{\dot{M}_{intake}}{\dot{V}_{intake}} \quad \Rightarrow \quad \dot{M}_{intake} = \dot{V}_{intake} \cdot \frac{P_{manifold}}{R \cdot T_{manifold}}$$

The volume flow rate taken in by the engine is directly proportional to the engine r.p.m. and to the total engine capacity, according to the formula:

$$\dot{V}_{intake} = \eta_{vol} \cdot \frac{rpm}{120} \cdot V_{cap}$$

where $\eta_{vol}$ is the "volumetric efficiency", rpm is the engine r.p.m. and $V_{cap}$ is the total engine capacity.

From the foregoing formulae, with simple substitutions, the flow rate of the mixture taken in by the engine is then obtained as a function of the engine r.p.m. and the pressure and temperature in the air-intake manifold 13:

$$\dot{M}_{intake}^* = \eta_{vol} \cdot \frac{rpm}{120} \cdot V_{cap} \cdot \frac{P_{manifold}}{R \cdot T_{manifold}} \qquad (2)$$

The above equation is commonly known as speed-density method.

Once the flow rate of the gaseous mixture taken in by the engine (Equation 2) and the concentration of EGR (Equation 1) have been determined, in a block 36 subsequent to block 35, the flow rate of fresh air taken in by the engine is finally determined according to the following formula:

$$\dot{M}_{fresh\_air} = (1 - \%\ EGR) \cdot \dot{M}_{intake} \qquad (3)$$

The use of the speed-density method (Equation 2) requires a sufficiently fast measurement of the temperature and pressure of the gaseous mixture within the air-intake manifold 13, that is compatible with the dynamics of the air flow rate that are to be calculated. The pressure sensors used have adequate response times, whilst the temperature sensors currently on the market are rather slow (response times in the region of a few seconds).

To overcome said drawback, a further aspect of the present invention envisages estimating the temperature of the gaseous mixture taken in. For this purpose, the second UHEGO probe 27 is used, which is arranged in the gas-exhaust system 4 and supplies information correlated to the air/fuel ratio in the combustion chamber.

Figure 4:
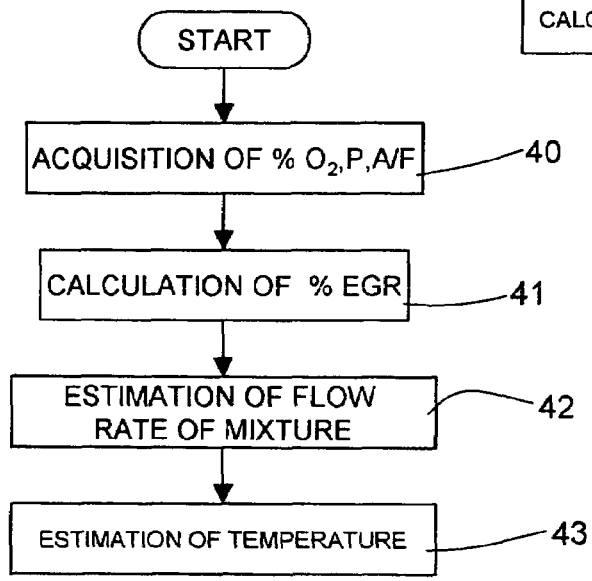

With reference to FIG. 4, in a first block 40 the following measurements are acquired: the pressure in the air-intake manifold 13 from the pressure/temperature sensor 26, the oxygen concentration in the gaseous mixture taken in provided by the first UHEGO probe 25, and the air/fuel ratio from the second UHEGO probe 27.

In a block 41 subsequent to block 40 the EGR percentage is calculated according to Equation 1.

Then, (block 42) in a first operating cycle (i-th cycle) of the electronic control unit 29, the flow rate of the gaseous mixture taken in by the engine is estimated according to the measurements of the first and second UHEGO probe 25, 27 and to the knowledge of the amount of fuel injected (Q). In detail, from the information on the air/fuel ratio supplied by the second UHEGO probe 27 and from the knowledge of the amount of fuel injected the flow rate of fresh air taken in is obtained in a known way, and hence the flow rate of gaseous mixture taken in is obtained by solving Equation (3) as a function of $\dot{M}_{intake}^*$:

$$\dot{M}_{intake}^*[i] = \frac{\dot{M}_{fresh\_air}}{(1 - \%\ EGR)}$$

In a block 43 subsequent to block 42 the temperature in the air-intake manifold 13 is finally estimated by solving the speed-density formula (2) as a function of $T_{manifold}$:

$$T_{manifold}[i] = \eta_{vol} \cdot \frac{rpm}{120} \cdot V_{cap} \cdot \frac{P_{manifold}}{R \cdot \dot{M}_{intake}^*}$$

At the next operating cycle (i+1-th cycle), the electronic control unit 29 will use the temperature $T_{manifold}[i]$ estimated in the preceding operating cycle (i-th cycle) for calculating the flow rate of the mixture taken in and for implementing the control of the EGR system, as described previously.

Figure 5:
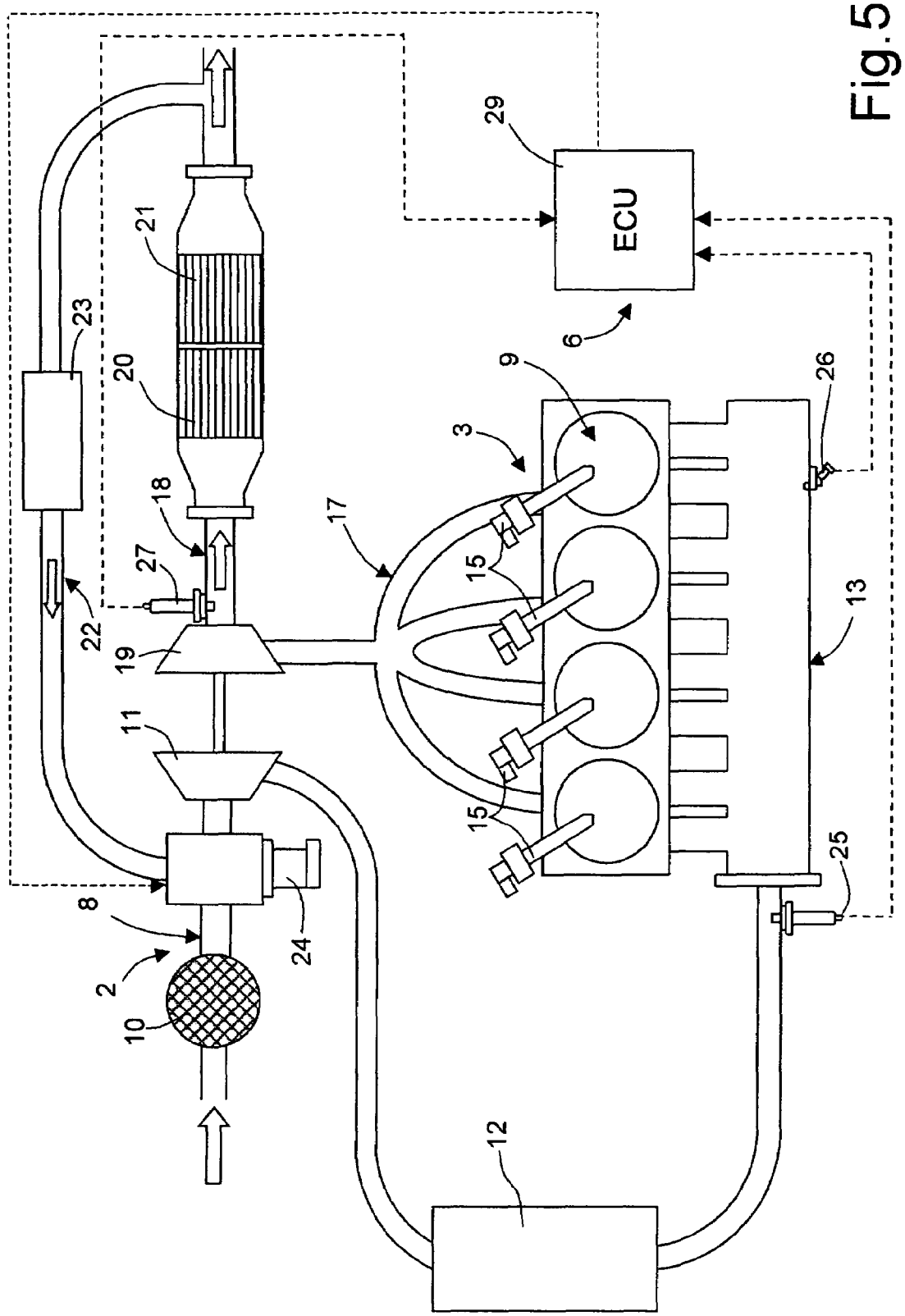
FIG. 5 is a schematic illustration of a second embodiment of the portion of engine of FIG. 1.

According to a further aspect of the present invention (see FIG. 5), the exhaust-gas-recirculation system 5 has a different structure. In particular, as may be noted, the exhaust gases are taken downstream of the turbine 19 and of the post-treatment devices (oxidizing catalytic converter 20 and particulate filter 21) and recirculated upstream of the compressor 11. The first UHEGO probe 25 is still set downstream of the EGR valve 24 so as to be impinged upon by the gaseous mixture taken in by the engine, and preferably downstream of the compressor 11 and the intercooler 12, in a position close to the cylinders 9. The control strategy described with reference to the structure of the exhaust-gas-recirculation system 5 of FIG. 1 continues to remain valid without any modifications.

From an examination of the characteristics of the present invention the advantages that it enables emerge clearly.

The measurement of the oxygen concentration in the gaseous mixture taken in by the engine makes it possible to carry out a more accurate control of the engine, and in particular of the exhaust gas recirculation. In fact, it is now possible to perform a closed-loop control based upon the concentration of recirculated exhaust gases in the mixture taken in by the engine, and moreover to diagnose any possible anomalies in the air system, for example of the EGR valve, with consequent reductions in the pollutant emissions, in the drifts and deviations from engine to engine.

Furthermore, the use of the UHEGO probe in the air-intake system makes it possible to derive the flow rate of air taken in, which is to be used not only for the control of the EGR system but also for other purposes linked in general to the control of engine operation, without the need to resort to the use of the debimeter, thus rendering said component altogether superfluous. This characteristic is all the more advantageous if it is taken into account that the debimeter is a costly component that is often subject to effects of dirtying and drifting over time.

Furthermore, as it has been emphasized, the UHEGO probe in the air-intake system, combined with the UHEGO probe in the exhaust system, enables the temperature in the air-intake manifold to be estimated. In this way, it is possible to track the variations in temperature due to the dynamics of the fluids in a more efficient way with respect to the case in which a temperature sensor is used.

Finally, the use of an EGR system configured as illustrated in FIG. 4 proves particularly advantageous in so far as a better mixing of the flow of air that impinges upon the UHEGO probe in the air-intake system is obtained, given that the exhaust-gas recirculation occurs upstream of the compressor. Furthermore, the mixture of air and recirculated exhaust gases traverses the intercooler, with the consequence that smaller variations of temperature in the air-intake manifold are obtained. The speed-density formula can consequently be used with greater accuracy; in particular, it might no longer be necessary to estimate the temperature in the manifold.

Finally, it is clear that modifications and variations may be made to what is described and illustrated herein, without thereby departing from the scope of the present invention, as defined in the appended claims.

In particular, it is clear how the present invention is not limited to a use within a supercharged diesel engine, but can be applied in any internal-combustion engine provided with an air-intake system, a gas-exhaust system and an EGR system.

The invention claimed is:

1. A device for controlling the exhaust gas recirculation in an internal-combustion engine, said engine being provided with an air-intake system, a gas-exhaust system, and an exhaust-gas-recirculation system; said device comprising measuring means for measuring the oxygen concentration in the air/recirculated-exhaust-gas mixture taken in by the engine; and control means connected to said measuring means and to the exhaust-gas-recirculation system for controlling the exhaust gas recirculation on the basis of The oxygen concentration in the mixture taken in by the engine said control means comprising
means for calculating the concentration of recirculated exhaust gases (% EGR) in the mixture taken in by the engine as a function of the oxygen concentration in the mixture itself, in particular according to the following equation:

$$\% \ EGR = 1 - \frac{\% \ O_{2,air+EGR}}{\% \ O_{2,air}}$$

wherein % $O_{2,air}$ is the oxygen concentration in the air and % $O_{2,air+EGR}$ is the oxygen concentration in the mixture taken in;
and wherein said control means implements a closed-loop control of the exhaust gas recirculation based on the concentration of recirculated exhaust gases (% EGR) in the mixture taken in by the engine.

2. The device according to claim 1, wherein said measuring means comprise an oxygen sensor arranged in the air-intake system in a section traversed, in use, by the air/recirculated-exhaust-gas mixture.

3. The device according to claim 2, wherein said oxygen sensor is a linear oxygen sensor.

4. The device according to claim 2, wherein said oxygen sensor is a UHEGO probe.

5. The device according to claim 1, wherein the exhaust-gas-recirculation system comprises an exhaust-gas-recirculation conduit, connecting the gas-exhaust system to the air-intake system, and a flow rate control valve arranged along the exhaust-gas-recirculation conduit and controlled by said control means.

6. The device according to claim 1, wherein said control means further comprise:
means for calculating the flow rate ($\dot{M}_{intake}$) of the mixture taken in by the engine as a function of the pressure ($P_{manifold}$) and the temperature ($T_{manifold}$) of the mixture itself, in particular according to the following equation:

$$\dot{M}_{intake} = \eta_{vol} \cdot \frac{rpm}{120} \cdot V_{cap} \cdot \frac{P_{manifold}}{R \cdot T_{manifold}}$$

in which $\eta_{vol}$ is the volumetric efficiency, R is a constant characteristic of the gaseous mixture, rpm is the engine r.p.m. and $V_{cap}$ is the engine capacity; and
means for calculating the flow rate ($\dot{M}_{fresh\_air}$) of air taken in by the engine as a function of the flow rate ($\dot{M}_{intake}$) of the mixture taken in by the engine and the concentration of recirculated exhaust gases (% EGR) in the mixture itself, in particular according to the following equation:

$$\dot{M}_{fresh\_air} = (1 - \% \ EGR) \cdot \dot{M}_{intake}$$

7. The device according to claim 1, further comprising means for measuring the oxygen concentration in the exhaust gases;
and wherein said control means further comprise:
means for calculating the temperature ($T_{manifold}$) of the mixture taken in by the engine as a function of the oxygen concentration in the exhaust gases and the concentration of recirculated exhaust gases (% EGR) in the mixture itself.

8. The device according to claim 7, wherein said means for calculating the temperature ($T_{manifold}$) of the mixture taken in by the engine comprise:
means for calculating the flow rate ($\dot{M}_{intake}$) of the mixture taken in by the engine as a function of the oxygen concentration in the exhaust gases and the concentration of recirculated exhaust gases (% EGR) in the mixture itself; and
means for calculating the temperature ($T_{manifold}$) of the mixture taken in by the engine as a function of the flow rate ($\dot{M}_{intake}$) of the mixture taken in by the engine.

9. The device according to claim 7, wherein said means for measuring the oxygen concentration in the exhaust gases comprise an oxygen sensor arranged in the gas-exhaust system.

10. The device according to claim 9, wherein said oxygen sensor is a linear oxygen sensor.

11. The device according to claim 9, wherein said oxygen sensor is a UHEGO probe.

12. A method for controlling the exhaust gas recirculation in an internal-combustion engine, said engine being provided with an air-intake system, a gas-exhaust system, and an exhaust-gas-recirculation system; said method being characterized by comprising the steps of:
measuring the oxygen concentration in the air/recirculated-exhaust-gas mixture taken in by the engine; and
controlling the exhaust gas recirculation on the basis of the oxygen concentration in the mixture taken in by the engine which comprises the steps of:
calculating the concentration of recirculated exhaust gases (% EGR) in the mixture taken in by the engine as a function of the oxygen concentration in the mixture itself, in particular according to the following equation:

$$\% \ EGR = 1 - \frac{\% \ O_{2,air+EGR}}{\% \ O_{2,air}}$$

in which % $O_{2,air}$ is the oxygen concentration in the air and % $O_{2,air+EGR}$ is the oxygen concentration in the mixture; and
controlling via a closed-loop control the exhaust gas recirculation on the basis of the concentration of recirculated exhaust gases (% EGR) in the mixture taken in by the engine.

13. The method according to claim 12, wherein said step of measuring the oxygen concentration in the air/recirculated-exhaust-gas mixture taken in by the engine comprises the step of:
arranging an oxygen sensor in the air-intake system in a section traversed, in use, by the air/recirculated-exhaust-gas mixture.

14. The method according to claim 13, wherein said oxygen sensor is a linear oxygen sensor.

15. The method according to claim 13, wherein said oxygen sensor is a UHEGO probe.

16. The method according to claim 12, for an exhaust-gas-recirculation system comprising an exhaust-gas-recirculation conduit, connecting the gas-exhaust system to the air-intake system, and a flow rate control valve arranged along the exhaust-gas-recirculation conduit; wherein the step of controlling the exhaust gas recirculation on the basis of the oxygen concentration in the mixture taken in by the engine comprises the step of controlling said flow rate control valve.

17. The method according to claim 12, wherein said step of controlling the exhaust gas recirculation on the basis of the oxygen concentration in the mixture taken in by the engine comprises the steps of:
calculating the flow rate ($\dot{M}_{intake}$) of the mixture taken in by the engine as a function of the pressure ($P_{manifold}$) and the temperature ($T_{manifold}$) of the mixture itself, in particular according to the following equation:

$$\dot{M}_{intake} = \eta_{vol} \cdot \frac{rpm}{120} \cdot V_{cap} \cdot \frac{P_{manifold}}{R \cdot T_{manifold}}$$

in which $\eta_{vol}$ is the volumetric efficiency, R is a constant characteristic of the gaseous mixture, rpm is the engine r.p.m. and $V_{cap}$ is the engine capacity; and
calculating the flow rate ($\dot{M}_{fresh\_air}$) of air taken in by the engine as a function of the flow rate ($\dot{M}_{intake}$) of the mixture taken in by the engine and the concentration of recirculated exhaust gases (% EGR) in the mixture itself, in particular according to the following equation:

$$\dot{M}_{fresh\_air} = (1 - \% \text{ EGR}) \cdot \dot{M}_{intake}$$

18. The method according to claim 17, further comprising the step of:
measuring the oxygen concentration in the exhaust gases, and wherein said step of controlling the exhaust gas recirculation on the basis of the oxygen concentration in the mixture taken in by the engine further comprises the step of:
calculating the temperature ($T_{manifold}$) of the mixture taken in by the engine as a function of the oxygen concentration in the exhaust gases and the concentration of recirculated exhaust gases (% EGR) in the mixture itself.

19. The method according to claim 18, wherein said step of calculating the temperature ($T_{manifold}$) of the mixture taken in by the engine further comprises the steps of:
calculating the flow rate ($\dot{M}_{intake}$) of the mixture taken in by the engine as a function of the oxygen concentration in the exhaust gases and the concentration of recirculated exhaust gases (% EGR) in the mixture itself; and
calculating the temperature ($T_{manifold}$) of the mixture taken in by the engine as a function of the flow rate ($\dot{M}_{intake}$) of the mixture taken in by the engine.

20. A device for determining the flow rate of air taken into an internal-combustion engine, said engine being provided with an air-intake system, a gas-exhaust system, and an exhaust-gas-recirculation system, which comprises: measuring means for measuring the oxygen concentration in the air/recirculated-exhaust-gas mixture taken in by the engine; and determining means for determining the flow rate ($\dot{M}_{fresh\_air}$) of air taken in by the engine connected to said measuring means for calculating the flow rate ($\dot{M}_{fresh\_air}$) of air taken in by the engine as a function of the oxygen concentration in the mixture taken in by the engine.

21. The device according to claim 20, wherein said measuring means comprise an oxygen sensor arranged in the air-intake system in a section traversed, in use, by the air/recirculated-exhaust-gas mixture.

22. The device according to claim 21, wherein said oxygen sensor is a liner oxygen sensor.

23. The device according to claim 21, wherein said oxygen sensor is a UHEGO probe.

24. The device according to claim 20, wherein said determining means comprise:
means for calculating the concentration of recirculated exhaust gases (% EGR) in the mixture taken in by the engine as a function of the oxygen concentration in the mixture itself, in particular according to the following equation:

$$\% \text{ } EGR = 1 - \frac{\% \text{ } O_{2,air+EGR}}{\% \text{ } O_{2,air}}$$

in which % $O_{2,air}$ is the oxygen concentration in the air and % $O_{2,air+EGR}$ is the oxygen concentration in the mixture taken in;
means for calculating the flow rate ($\dot{M}_{intake}$) of the mixture taken in by the engine as a function of the pressure ($P_{manifold}$) and the temperature ($T_{manifold}$) of the mixture itself, in particular according to the following equation:

$$\dot{M}_{intake} = \eta_{vol} \cdot \frac{rpm}{120} \cdot V_{cap} \cdot \frac{P_{manifold}}{R \cdot T_{manifold}}$$

in which $\eta_{vol}$ is the volumetric efficiency, R is a constant characteristic of the gaseous mixture, rpm is the engine r.p.m. and $V_{cap}$ is the engine capacity; and
means for calculating the flow rate ($\dot{M}_{fresh\_air}$) of air taken in by the engine as a function of the flow rate ($\dot{M}_{intake}$) of the mixture taken in by the engine and the concentration of recirculated exhaust gases (% EGR) in the mixture itself, in particular according to the following equation:

$$\dot{M}_{fresh\_air} = (1 - \% \text{ EGR}) \cdot \dot{M}_{intake}$$

25. The device according to claim 24, further comprising means for measuring the oxygen concentration in the exhaust gases;
and wherein said determining means further comprise:
means for calculating the temperature ($T_{manifold}$) of the mixture taken in by the engine as a function of the oxygen concentration in the exhaust gases and the concentration of recirculated exhaust gases (% EGR) in the mixture itself.

26. The device according to claim 25, wherein said means for calculating the temperature ($T_{manifold}$) of the mixture taken in by the engine comprise:
means for calculating the flow rate ($\dot{M}_{intake}$) of the mixture taken in by the engine as a function of the oxygen concentration in the exhaust gases and the concentration of recirculated exhaust gases (% EGR) in the mixture itself; and
means for calculating the temperature ($T_{manifold}$) of the mixture taken in by the engine as a function of the flow rate ($\dot{M}_{intake}$) of the mixture taken in by the engine.

27. The device according to claim 24, wherein said means for measuring the oxygen concentration in the exhaust gases comprise an oxygen sensor arranged in the exhaust system.

28. The device according to claim 27, wherein said oxygen sensor is a linear oxygen sensor.

29. The device according to claim 27, wherein said oxygen sensor is a UHEGO probe.

30. A method for determining the flow rate of air taken into an internal-combustion engine, said engine being provided with an air-intake system, a gas-exhaust system, and an exhaust-gas-recirculation system; which comprises the steps of:
 measuring the oxygen concentration in the air/recirculated-exhaust-gas mixture taken in by the engine; and
 determining the flow rate ($\dot{M}_{fresh\_air}$) of air taken in by the engine as a function of the oxygen concentration in the mixture taken in by the engine.

31. The method according to claim 30, wherein said step of measuring the oxygen concentration in the air/recirculated-exhaust-gas mixture taken in by the engine comprises the step of:
 arranging a oxygen sensor in the air-intake system in a section traversed, in use, by the air/recirculated-exhaust-gas mixture.

32. The method according to claim 31, wherein said oxygen sensor is a linear oxygen sensor.

33. The method according to claim 31, wherein said oxygen sensor is a UHEGO probe.

34. The method according to claim 30, wherein said step of determining the flow rate ($\dot{M}_{fresh\_air}$) of air taken in by the engine comprises the steps of:
 calculating the concentration of recirculated exhaust gases (% EGR) in the mixture taken in by the engine as a function of the oxygen concentration in the mixture itself, in particular according to the following equation:

$$\% \ EGR = 1 - \frac{\% \ O_{2,air+EGR}}{\% \ O_{2,air}}$$

in which % $O_{2,air}$ is the oxygen concentration in the air and % $O_{2,air+EGR}$ is the oxygen concentration in the mixture;
 calculating the flow rate ($\dot{M}_{intake}$) of the mixture taken in by the engine as a function of the pressure ($P_{manifold}$) and the temperature ($T_{manifold}$) of the mixture itself, in particular according to the following equation:

$$\dot{M}_{intake} = \eta_{vol} \cdot \frac{rpm}{120} \cdot V_{cap} \cdot \frac{P_{manifold}}{R \cdot T_{manifold}}$$

in which $\eta_{vol}$ is the volumetric efficiency, R is a constant characteristic of the gaseous mixture, rpm is the engine r.p.m. and $V_{cap}$ is the displacement of the engine; and
 calculating the flow rate ($\dot{M}_{fresh\_air}$) of air taken in by the engine as a function of the flow rate ($\dot{M}_{intake}$) of the mixture taken in by the engine and the concentration of recirculated exhaust gases (% EGR) in the mixture itself, in particular according to the following equation:

$$\dot{M}_{fresh\_air} = (1 - \% \ EGR) \cdot \dot{M}_{intake}$$

35. The method according to claim 34, further comprising the step of:
 measuring the oxygen concentration in the exhaust gases, and in which said step of determining further comprises the step of:
 calculating the temperature ($T_{manifold}$) of the mixture taken in by the engine as a function of the oxygen concentration in the exhaust gases and the concentration of recirculated exhaust gases (% EGR) in the mixture itself.

36. The method according to claim 35, wherein said step of calculating the temperature ($T_{manifold}$) of the mixture taken in by the engine further comprises the steps of:
 calculating the flow rate ($\dot{M}_{intake}$) of the mixture taken in by the engine as a function of the oxygen concentration in the exhaust gases and the concentration of recirculated exhaust gases (% EGR) in the mixture itself; and
 calculating the temperature ($T_{manifold}$) of the mixture taken in by the engine as a function of the flow rate ($\dot{M}_{intake}$) of the mixture taken in by the engine.

37. A device for controlling the exhaust gas recirculation in an internal-combustion engine, said engine being provided with an air-intake system, a gas-exhaust system, and an exhaust-gas-recirculation system; said device comprising measuring means for measuring the oxygen concentration in the air/recirculated-exhaust-gas mixture taken in by the engine; and control means connected to said measuring means and to the exhaust-gas-recirculation system for controlling the exhaust gas recirculation on the basis of the oxygen concentration in the mixture taken in by the engine, said control means comprising:
 means for calculating the concentration of recirculated exhaust gases (% EGR) in the mixture taken in by the engine as a function of the oxygen concentration in the mixture itself wherein said control means implements a closed-loop control of the exhaust gas recirculation based on the concentration of recirculated exhaust gases (% EGR) in the mixture taken in by the engine, wherein said control means further comprises:
 means for calculating the flow rate ($\dot{M}_{intake}$) of the mixture taken in by the engine as a function of the pressure ($P_{manifold}$) and the temperature ($T_{manifold}$) of the mixture itself; and
 means for calculating the flow rate ($\dot{M}_{fresh\_air}$) of air taken in by the engine as a function of the flow rate ($\dot{M}_{intake}$) of the mixture taken in by the engine and the concentration of recirculated exhaust gases (% EGR) in the mixture itself.

38. A method for controlling the exhaust gas recirculation in an internal-combustion engine, said engine being provided with an air-intake system, a gas-exhaust system, and an exhaust-gas-recirculation system; said method comprising the steps of:
 measuring the oxygen concentration in the ak/recirculated-exhaust-gas mixture taken in by the engine; and
 controlling the exhaust gas recirculation on the basis of the oxygen concentration in the mixture taken in by the engine which comprises the steps of:
 calculating the concentration of recirculated exhaust gases (% EGR) in the mixture taken in by the engine as a function of the oxygen concentration in the mixture itself and controlling via a closed-loop control the exhaust gas recirculation on the basis of the concentration of recirculated exhaust gases (% EGR) in the mixture taken by the engine wherein said step of controlling the exhaust gas recirculation on the basis of the oxygen concentration in the mixture taken in by the engine comprises the steps of:

calculating the flow rate ($\dot{M}_{intake}$) of the mixture taken in by the engine as a function of the pressure ($P_{manifold}$) and the temperature ($T_{manifold}$) of the mixture itself and calculating the flow rate ($\dot{M}_{fresh\_air}$) of air taken in by the engine as a function of the flow rate ($\dot{M}_{intake}$) of the mixture taken in by the engine and the concentration of recirculated exhaust gases (% EGR) in the mixture itself.

\* \* \* \* \*